Mar. 3, 1925.

H. C. VAN HOUTEN

OIL WELL FISHING TOOL

Filed March 5, 1924

Witness:
R. E. Hamilton

Inventor;
H. C. Van Houten
By Thorpe Gerard
Attys.

Patented Mar. 3, 1925.

1,528,710

UNITED STATES PATENT OFFICE.

HAROLD C. VAN HOUTEN, OF TOPEKA, KANSAS.

OIL-WELL FISHING TOOL.

Application filed March 5, 1924. Serial No. 696,982.

*To all whom it may concern:*

Be it known that I, HAROLD C. VAN HOUTEN, a citizen of the United States, and a resident of Topeka, county of Shawnee, State of Kansas, have invented a certain new and useful Improvement in Oil-Well Fishing Tools, of which the following is a complete specification.

This invention relates to oil well fishing tools, and has for its object to produce an efficient and at the same time, simple, strong, durable and inexpensive tool adapted primarily for fishing sucker-rods from two-inch tubing, but also susceptible of use in tubing of other diameter and for gripping and extracting lost tubing, within a well hole or casing, and miscellaneous parts. Another object is to provide a fishing tool which is flexible so that it can pass rough or crooked places in tubing, which would interfere with and perhaps prevent the passage of a rigid tool.

Another object is to provide a tool of such shape that it can be made of maximum size and weight available for use in two-inch tubing, and hence possess the greatest possible strength.

With these general and other objects in view, the invention consists in novel and useful features of construction and combinations of parts as hereinafter described and claimed; and in order that it may be fully understood reference is to be had to the accompanying drawing, in which:—

Figure 1:
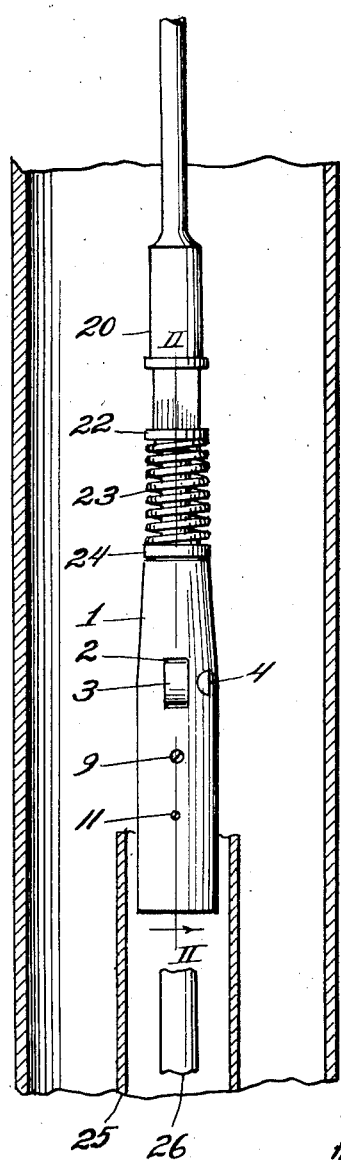
Figure 1 is a side elevation of a fishing tool embodying the invention, in operative relation to a tubing, and also shows a broken section of a sucker-rod for engagement and removal by the tool.
Figure 2:
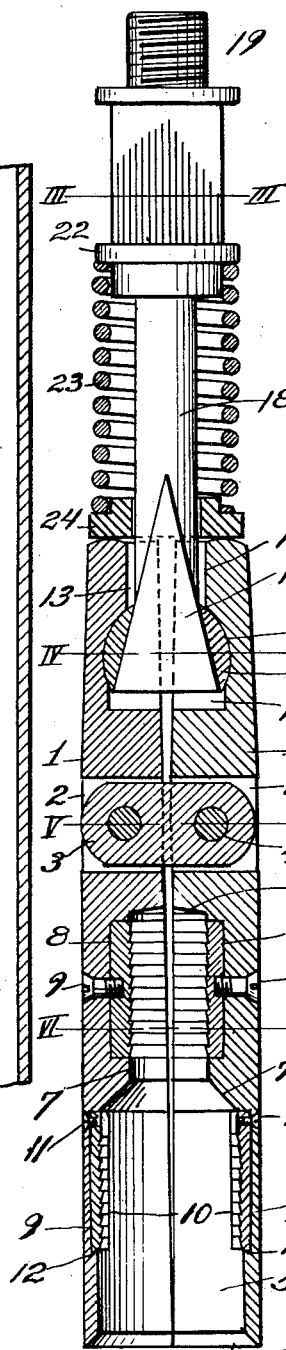
Figure 2 is an enlarged vertical section of the tool, the section being taken on the line II—II of Figure 1.
Figure 3:
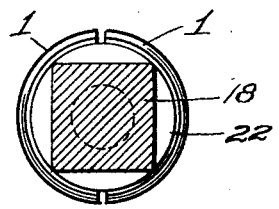
Figure 3 is a section on the line III—III of Figure 2.
Figure 4:
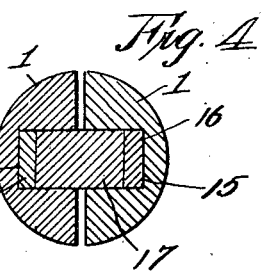
Figure 4 is a section on the line IV—IV of Figure 2.
Figure 5:
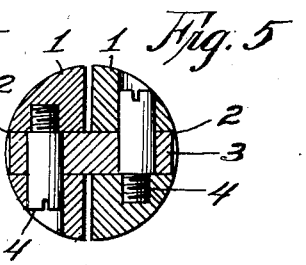
Figure 5 is a section on the line V—V of Figure 2.
Figure 6:
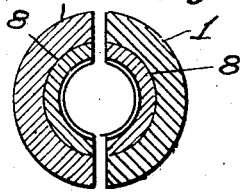
Figure 6 is a section on the line VI—VI of Figure 2.

In the said drawing, 1 indicates two similar members of segmental cross section, and provided at an intermediate point with alined openings 2 receiving the ends of a cross-link 3, the member being pivoted at the points 4 to the link for approaching and receding movement.

The members, below the link, constitute a pair of jaws, and are hollowed out at their inner sides to provide alined and communicating chambers 5 and 6 of different diameters to accommodate engagement with objects of different size, and the internal rib 7, at the junction of the chambers, forms a support or shelf for a pair of toothed gripping plates 8 of hardened metal, screw-bolts 9 retaining the plates in position when the latter are not performing their gripping function.

At opposite points the walls of the lower chamber 5, are provided with recesses 9 to afford support to toothed gripping plates 10. Screw-bolts 11 are employed to retain said plates in position, and the lower ends of the plates are preferably beveled and dovetailed as at 12 in the recesses, to effectively resist the strain imposed when extracting a sucker-rod or the like. The lower side of the rib 7, and the lower extremities of the jaws are respectively beveled at $7^a$ and $12^a$ to facilitate engagement of the tool with a sucker-rod, or the like.

The members 1 above their pivotal point of support, are hollowed out to two different depths at 13 and 14, and the walls are segmentally recessed at 15 for the reception of segmental wear plates 16, the inner or flat sides of which converge upwardly at angles corresponding to the tapered sides of a wedge 17. The taper of the wedge determines the angular relation of the wear plates, as the latter can turn or rotate and thereby adjust themselves to wedges of different dimensions.

The power applied on the gripping jaws commensurate with the weight to be raised, without changing the force applied to impart upward movement to the wedge, is determined by the character of the wedge, that is to say, a slender wedge will give greater gripping power to the jaws than a wider wedge, but no change of wear plates is needed, as they will rotate and hence automatically adjust themselves to the taper of the wedge.

The wedge is formed or secured at the lower end of a shank 18, and the latter preferably has threads 19 at its upper end for engagement by a string of sucker rods 20, in order to provide, through the weight of the latter, sufficient power to effect the opening of the jaws when resting upon a part to be grappled and raised. When used for extracting casing, the tool will be provided at its upper end with any suitable tool joint (not shown) for attachment to a drill stem suspended from a hoisting cable, or the like.

The shank is formed or provided with a downwardly-facing shoulder 22, engaged by the upper end of a coiled spring 23 fitting around the shank and bearing at its lower end upon a collar 24 fitting loosely on the shank and resting on the upper ends of the members 1. The force of the spring tends to hold the jaws in closed relation.

In operation the tool is lowered within a tubing 25 or the like, containing a broken sucker-rod 26, for example, and is manipulated until it is fitted over the upper end of the rod or impinges thereon. In the latter event the weight of the tool, supplemented by the string of sucker rods, or the like, is sufficient, upon encountering the rod, to overcome the resistance of the spring and thereby effect separating movement of the jaws, allowing the tool to pass over the broken sucker-rod. When lifting power is first applied the tool is forced down on the wedge by the spring thereby gripping the broken sucker-rod between plates 8 or plates 10 with the force of the spring and wedge. As the lifting power is increased the wedge is pulled upward, thereby giving a grip proportionate to the weight of the broken rods. Then the tool as a whole, moves upward to effect corresponding movement of the rod.

From the foregoing description of the tool and its operation, it will be apparent that the invention embodies the features of advantage set forth as desirable in the statement of the object of the invention, and while the preferred construction is shown, it will be obvious that changes may be made without departure from the principle of construction and mode of operation, and hence within the spirit and scope of the appended claims.

What I claim is:—

1. A fishing tool, comprising a pair of opposed members bearing a pivoted relation at an intermediate point of their length, the members, below the pivotal point constituting jaws for gripping upon opposite sides of an object, and above the pivotal point having segmental recesses, segmental wear plates rotatable in the recesses and forming opposed upwardly-converging faces, a wedge engaging said faces, yielding means tending to cause the wedge to move upwardly for effecting closure of the jaws, and suspension means for the wedge for raising and lowering the tool.

2. A fishing tool comprising a pair of semi-cylindrical members pivoted together at an intermediate point, with their flat or inner faces opposed, the members below the pivotal point constituting jaws, and above said pivotal point, being hollowed out and provided with opposed segmental recesses, segmental wear plates rotatably mounted in the said recesses, provided with upwardly-converging inner faces, a wedge engaging said faces, and provided with an upwardly-extending shank, a collar loosely mounted on the shank and resting on the members, a spring exerting force downwardly on the collar and upwardly on the wedge, and suspension means attached to the shank.

In witness whereof I hereunto affix my signature.

HAROLD C. VAN HOUTEN.